United States Patent
Olson

(10) Patent No.: US 6,446,924 B1
(45) Date of Patent: Sep. 10, 2002

(54) APPARATUS AND METHOD FOR SUPPORTING A DIAL TEST INDICATOR

(76) Inventor: Troy Daniel Olson, 18088 Aztec St., Andover, MN (US) 55304

( * ) Notice: Subject to any disclaimer, the term of this patent is extended or adjusted under 35 U.S.C. 154(b) by 0 days.

(21) Appl. No.: 09/643,376

(22) Filed: Aug. 22, 2000

(51) Int. Cl.[7] .................................................. E04G 3/00
(52) U.S. Cl. .................................. 248/280.11; 396/421
(58) Field of Search .................. 248/280.11, 278.1; 396/421

(56) References Cited

U.S. PATENT DOCUMENTS

| | | | |
|---|---|---|---|
| 2,456,003 | A | 12/1948 | Knutson |
| 2,466,722 | A | 4/1949 | May |
| 2,494,698 | A | 1/1950 | Forrest |
| 2,601,965 | A | 7/1952 | Scalise |
| 2,663,764 | A | 12/1953 | Holmes |
| 2,909,351 | A | 10/1959 | Pratt |
| 3,096,962 | A | 7/1963 | Meijs |
| 3,442,478 | A | 5/1969 | Parapetti |
| 3,531,867 | A | 10/1970 | Viollet |
| 3,858,836 | A | 1/1975 | Marcyan |
| 4,166,602 | A * | 9/1979 | Nilsen et al. ............ 248/280.1 |
| 4,208,157 | A | 6/1980 | Guarino et al. |
| 4,213,591 | A * | 7/1980 | Jaakkola .................. 248/281.1 |
| 4,402,481 | A | 9/1983 | Sasaki |
| 4,411,402 | A | 10/1983 | Keller |
| 4,418,476 | A | 12/1983 | Missun |
| 4,750,699 | A | 6/1988 | Tingley |
| 4,896,857 | A | 1/1990 | McCullough |
| 4,953,822 | A * | 9/1990 | Sharber et al. .......... 248/281.1 |
| 5,036,595 | A | 8/1991 | Nevery |
| 5,335,424 | A | 8/1994 | Spangler |
| 5,402,584 | A | 4/1995 | Kessler |
| 5,481,986 | A * | 1/1996 | Spencer et al. .......... 105/206.1 |
| 5,732,920 | A * | 3/1998 | Reynoso et al. ......... 248/278.1 |
| 6,012,693 | A * | 1/2000 | Voeller et al. ......... 248/280.11 |
| 6,030,130 | A * | 2/2000 | Paddock et al. ............ 396/421 |
| 6,032,381 | A | 3/2000 | Miller |

OTHER PUBLICATIONS

Rutland Tool and Supply Company Catalog; Year 2000; Title of Items on p. 473: "Genuine Indicol Universal Indicator Holders," "Axial–Holder" and "3D Magnetic Base".
Rutland Tool and Supply Company Catalog; Year 2000; Title of Items on p. 474: "Flex–O–Post Indicator Holder;" Published in United States.
Rutland Tool and Supply Company Catalog; Year 2000; Title of items on p. 466: "Zero–Set Test Indicator Setup Attachment;" Published in United States.

* cited by examiner

Primary Examiner—Anita King
Assistant Examiner—Kofi Schulterbrandt
(74) Attorney, Agent, or Firm—Michael A. Mochinski

(57) ABSTRACT

A new and improved apparatus for supporting a dial test indicator in a tooling machine comprising at least a pair of pivoting arms that are pivotally attached to a pair of pivoting ends which permit the arms to be positioned parallel to one another and operate in unison motion. This configuration allows the dial test indicator support to maintain constant latitude throughout a full of range of motion during adjustment thereof, resulting in an indicator support that can quickly assist in the acquisition of precise, accurate measurement of the workpiece. Further, the dial test indicator support requires no active adjustment of fastening screws and the alike during repositioning of the arms for progressive measurement of the workpiece. The dial test indicator support further comprises a mounting shank for attachment to a tooling machine spindle and a dovetail that is geometrically configured and capable of supporting a dial test indicator having either a mounting shank attached thereto or a dovetail-tongued mount. Additionally, the dial test indicator support can be adapted for use with conventional height gauges and can be utilized with a variety of tooling machines, such as milling machines, lathes, drill presses, and horizontal boring mills.

19 Claims, 10 Drawing Sheets

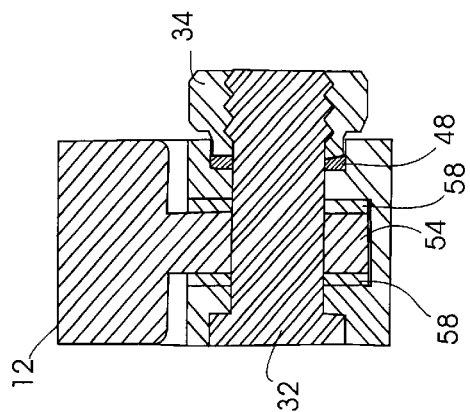
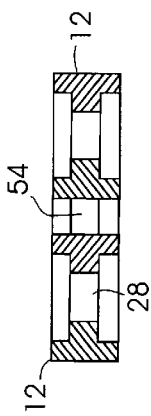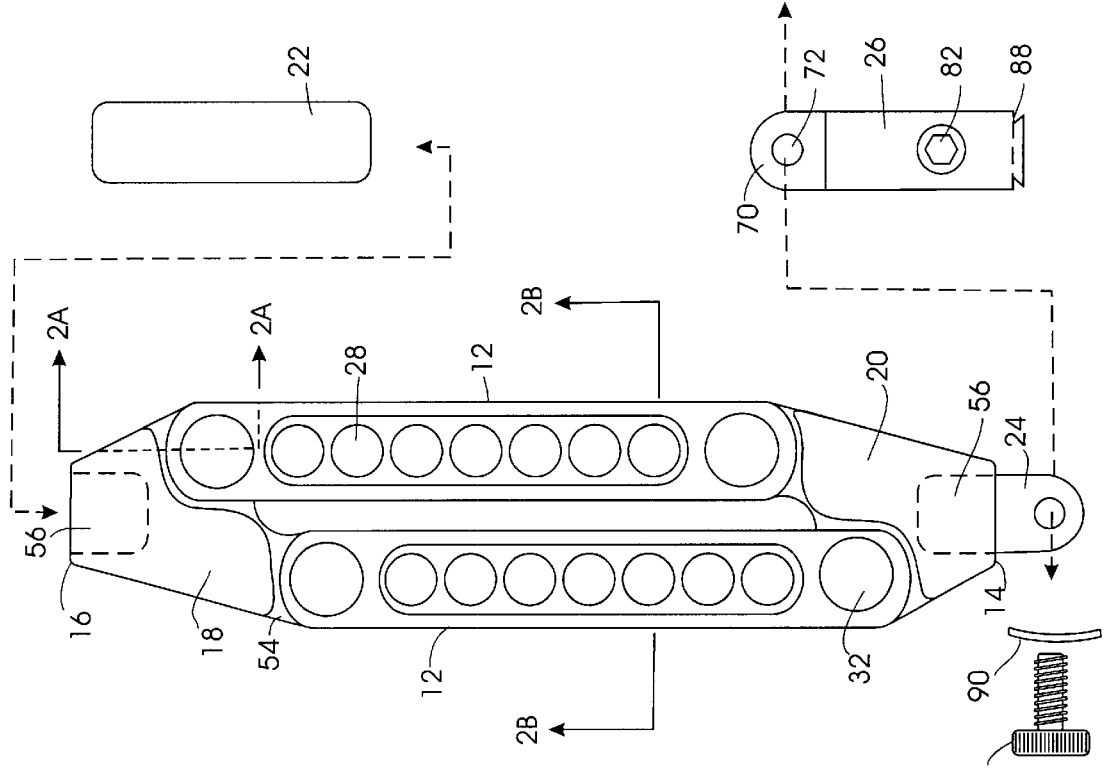

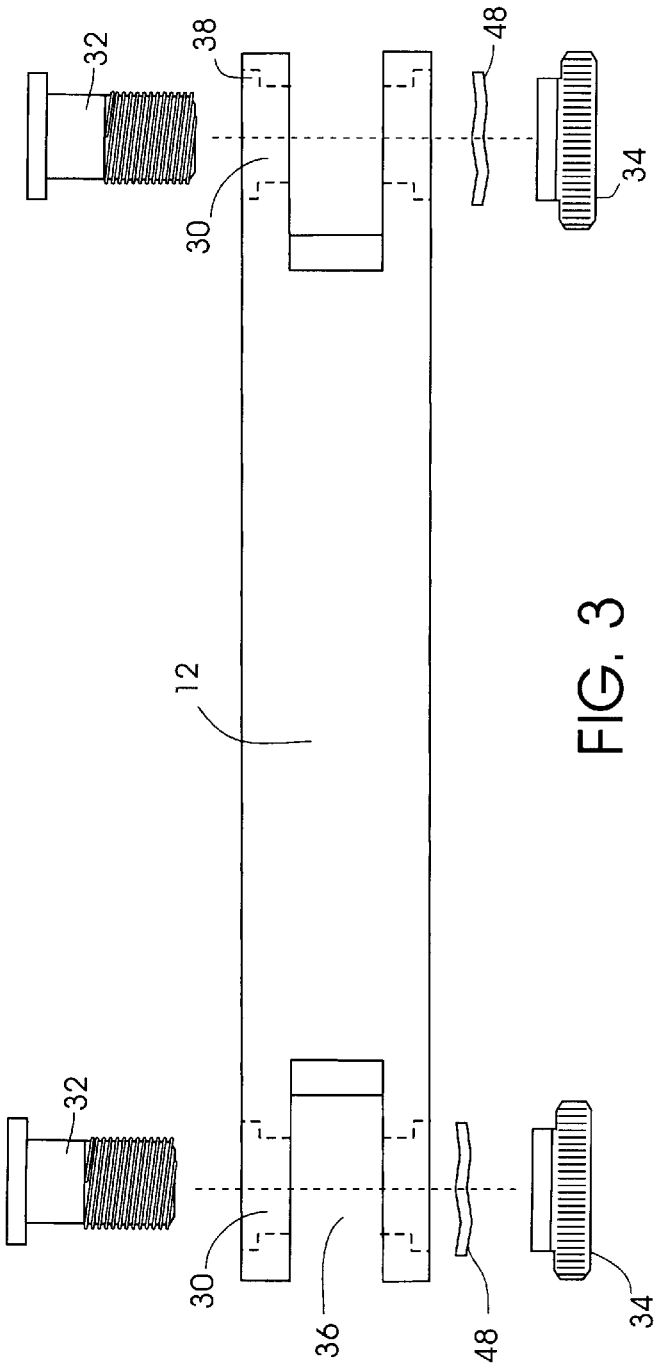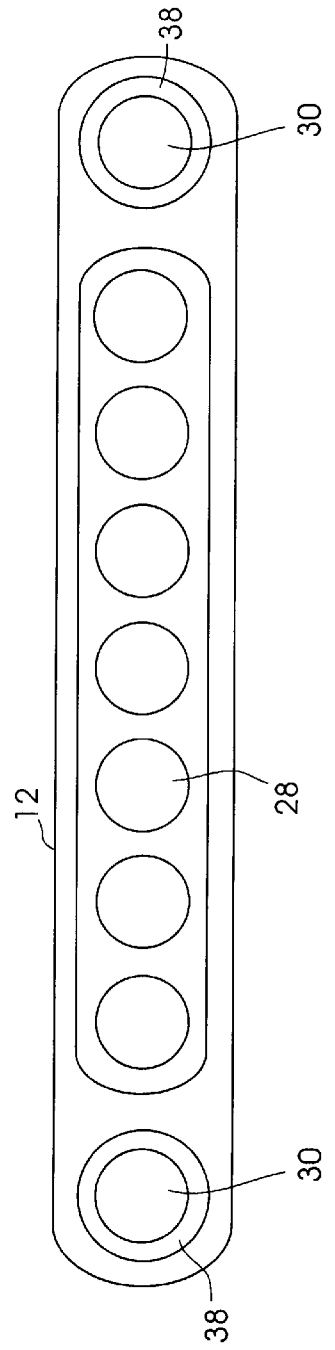
FIG. 3
FIG. 4

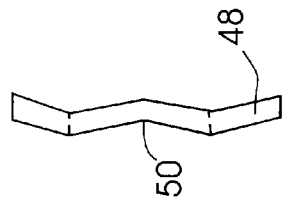
FIG. 7
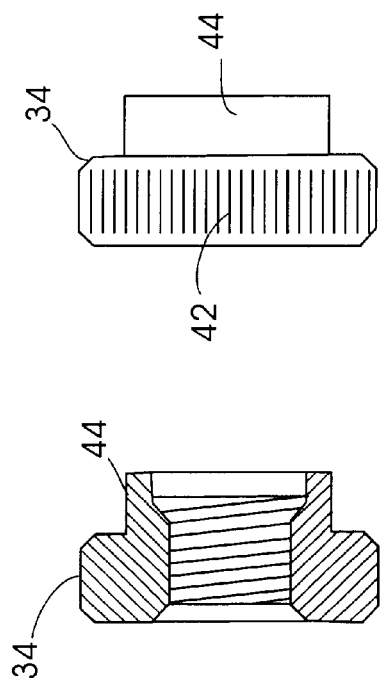
FIG. 8
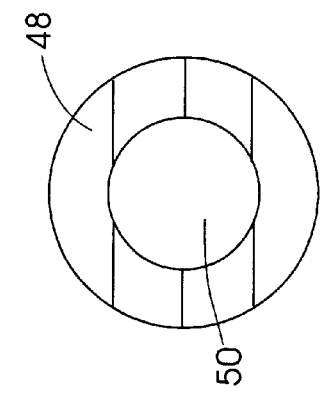
FIG. 5
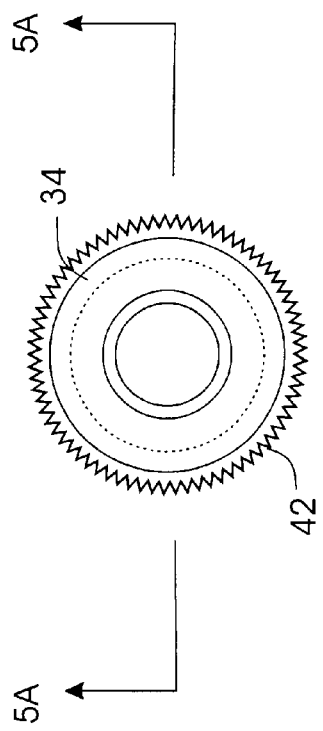
FIG. 6
FIG. 5A

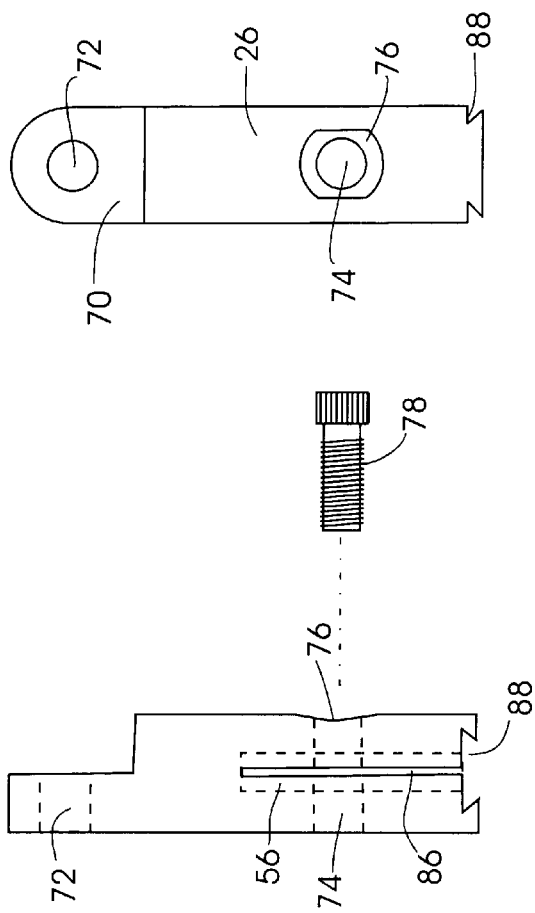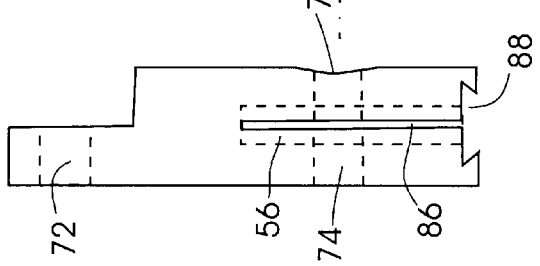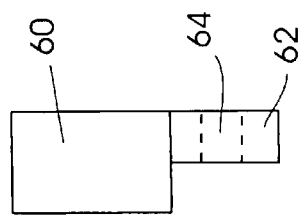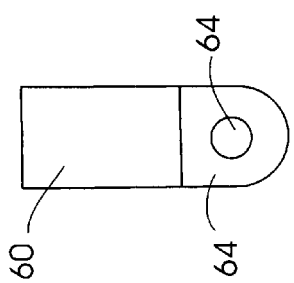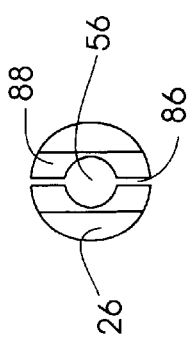
FIG. 18
FIG. 19
FIG. 17
FIG. 16
FIG. 15

APPARATUS AND METHOD FOR SUPPORTING A DIAL TEST INDICATOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates an apparatus and method for supporting a dial test indicator. In particular, the present invention relates to a new and improved dial test indicator support having a pair of pivoting arms which can be conveniently and easily positioned near the machined workpiece without having to loosen or remove fastening screws. More importantly, the present invention is capable of maintaining constant latitude throughout the full range of motion.

BACKGROUND OF THE INVENTION

The utilization of dial test indicator holders and the alike are well known in the art. Dial indicators are used in a variety of machining environments and are often used in conjunction with a support or holder. In a conventional sense, one end of the dial test holder is adapted to fit into a tooling machine spindle or attach to the outside of the spindle, which is referred to as the quill, through the use of a C-shaped clamp. The other end of the dial test holder is generally fitted with a dovetail or similar device that accepts a dial test indicator mounting shank or a dovetail-tongued mount.

A number of dial test indicators disclosed in the prior art are inherently cumbersome to adjust or are very complex in design. For instance, U.S. Pat. No. 4,750,699 discloses a dial test indicator holder comprising a series of main body links interconnected by a series of intermediate links, which can be added or removed to accommodate for differing measurement conditions. Although this type of indicator holder may allow for versatility, it may at the same time cause a newly created problem, namely instrument sag or indicator drop. Instrument sag may be caused simply by the weight of added links or overreaching of the indicator holder in the presence of gravitational forces acting thereon. Such sagging may adversely affect accurate taking of measurements and hence errors in precision machining operations.

Other problem areas apparent in the prior art include unintentional twisting of the indicator holder during the taking of concentric measurements and undue springiness in the arms or links of the indicator holder. Another problematic area disclosed by the prior art include indicator holders that are adapted to fit the quill of the tooling machine. These particular designs often lead to imprecise measurement of the workpiece duly based on the assumption that the quill is perfectly concentric. Should the quill possess any irregularities in concentricity or deformities, then the resulting measurement will be inaccurate to the extent of these irregularities or deformities.

However, the most prevalent problem found in the prior art is the inability of the dial test indicator holder to maintain constant latitude during adjustment thereof. Many, if not all indicator holders, lose their ability to maintain the angle at which the dial test indicator is initially set and positioned. By having to adjust and reposition the dial indicator to accommodate for varying configured workpieces, the user introduces a greater chance or probability of error in arriving at an accurate, precise measurement.

Generally, the prior art describes adjustment of the conventional indicator support by loosening or removing a multitude of fastening screws or a quill clamp and the alike. These particular types of holders are prone to inaccurate measurements over an extended period of time through frequent use due to the increased potential for wear, particularly where the adjusting screws are located. While there are certain recognizable problems in the field using such devices, machinists or other professionals using such instruments may overcome the foregoing problem by simply replacing the worn out device.

Accordingly, there still remains the need for a dial test indicator support that can maintain constant latitude throughout the full range of motion and is capable of being positioned near the workpiece without active manual adjustment of fastening screws and the alike. The dial test indicator support should be relatively accurate and precise in the measurement of the workpiece, dependable for long-term use, inexpensive to manufacture, simple in design, easily placed into position and removed, and not be subject to damage through proper use. The present invention is directed to the foregoing needs as well as to others as explained and described in the following sections.

BRIEF SUMMARY OF THE INVENTION

It is therefore an object of the present invention to provide a new and improved dial test indicator support which can be conveniently and easily positioned near the workpiece without the need to actively adjust fastening screws and the alike.

It is also an object of the present invention to provide a new and improved dial test indicator support which is simple in construction and inexpensive to manufacture.

It is another object of the present invention to provide a new and improved dial test indicator support which is capable of maintaining constant latitude throughout a full range of motion.

It is yet another object of the present invention to provide a new and improved dial indicator support which may be easily and efficiently manufactured and marketed.

It is even a further object of the present invention to provide a new and improved dial test indicator support which is of durable and reliable construction and not subject to premature wear necessitating replacement.

To achieve these objects, and others, the present invention essentially comprises a new and improved apparatus for supporting a dial test indicator, such invention comprising, in combination: at least a pair of pivoting arms, each having a distal end and a proximal end, such ends having a non-threaded aperture extending therethrough and a pivoting slot; first and second pivoting ends, each comprising a least a pair of pivoting flanges of which are geometrically configured to slideably fit within the pivoting slot, with each flange having a non-threaded aperture extending therethrough of which is alignable with the apertures of the distal and proximal ends and a longitudinal bore extending therein to a predetermined depth; a mounting shank that is geometrically configured at one end to slideably fit within the spindle of the tooling machine and second end that is adaptably fitted within the longitudinal bore of the first pivoting end; and a pivoting stem that is geometrically configured at one end to fit within the longitudinal bore of the second pivoting end and a second end having an aperture extending therethrough for pivotal attachment of a dovetail of which is capable of supporting the dial test indicator.

In operation, the mounting shank is slideably fitted within the spindle of the tooling machine, with the pivoting arms extending therefrom at a predetermined angle, in close proximity to the workpiece. The dial indicator mounting shank or dovetail-tongued mount is then slideably fitted to the dovetail and secured in place by a dovetail setscrew. Precise adjustment of the dial test indicator is achieved by simply loosening and tightening the thumb screw that is present on the side of the dovetail, where the pivoting stem pivotally attaches to the dovetail, and moving the dovetail to the desired location for precise measurement of the workpiece. Subsequent measurement of the workpiece is simply accomplished by handling and relocating the pivoting arms.

The present invention is particularly advantageous for quick, accurate measurement of workpieces having close tolerances. These advantages are very important to the average machinists and other similar professionals interested in economical and useful improvement of supporting a dial test indicator.

There has been described, rather broadly, the more important features of the present invention in order that the detailed description thereof that follows may be better understood, and in order that the present contribution to the art may be better appreciated.

It is understood that the present invention is not limited in its application to the details of construction and the arrangements of the components set forth in the following description or illustrated in the drawings. The present invention is capable of other embodiments and of being practiced and carried out in several ways. Further, it is to be understood that the phraseology and terminology employed herein are for the purpose of description and should not be regarded as limiting the scope of the present invention.

The foregoing objects of the present invention, combined with the various features of novelty which characterize the present invention, are pointed out with particularly in the claims annexed to and forming a part of this disclosure. For a greater understanding of the present invention, reference should be made to the accompanying drawings and descriptive matter in which there is illustrated the preferred embodiment of the present invention.

BRIEF DESCRIPTION OF THE SEVERAL VIEWS OF THE DRAWINGS

A preferred embodiment of the present invention will now be described by way of example with reference to the accompanying drawings, in which:

FIG. 2 is a side view of the preferred embodiment of the dial test indicator showing disassembled components thereof;

FIG. 2A is a sectional view of the preferred embodiment of the dial test indicator support taken along the line 2A—2A of FIG. 2;

FIG. 2B is a sectional view of the preferred embodiment of the dial test indicator support taken along the line 2B—2B of FIG. 2;

FIG. 3 is a top plan view of the pivoting arm in isolation;

FIG. 4 is a side elevational view of the pivoting arm of FIG. 3;

FIG. 5 is a top plan view of the pivoting nut in isolation;

FIG. 5A is a sectional view of the pivoting nut taken along the line 5A—5A of FIG. 5;

FIG. 6 is a side elevational view of the pivoting nut of FIG. 5;

FIG. 7 is a top plan view of the wave washer in isolation;

FIG. 8 is a side elevational view of the wave washer of FIG. 7;

FIG. 15 is a side elevational view of the pivoting stem in isolation;

FIG. 16 is a side elevational view of the pivoting stem of FIG. 15;

FIG. 17 is a side elevational view of the dovetail in isolation;

FIG. 18 is a side elevational view of the dovetail of FIG. 17;

FIG. 19 is a bottom plan view of the dovetail of FIGS. 17 and 18; and

DETAILED DESCRIPTION OF THE INVENTION

Figure 1:
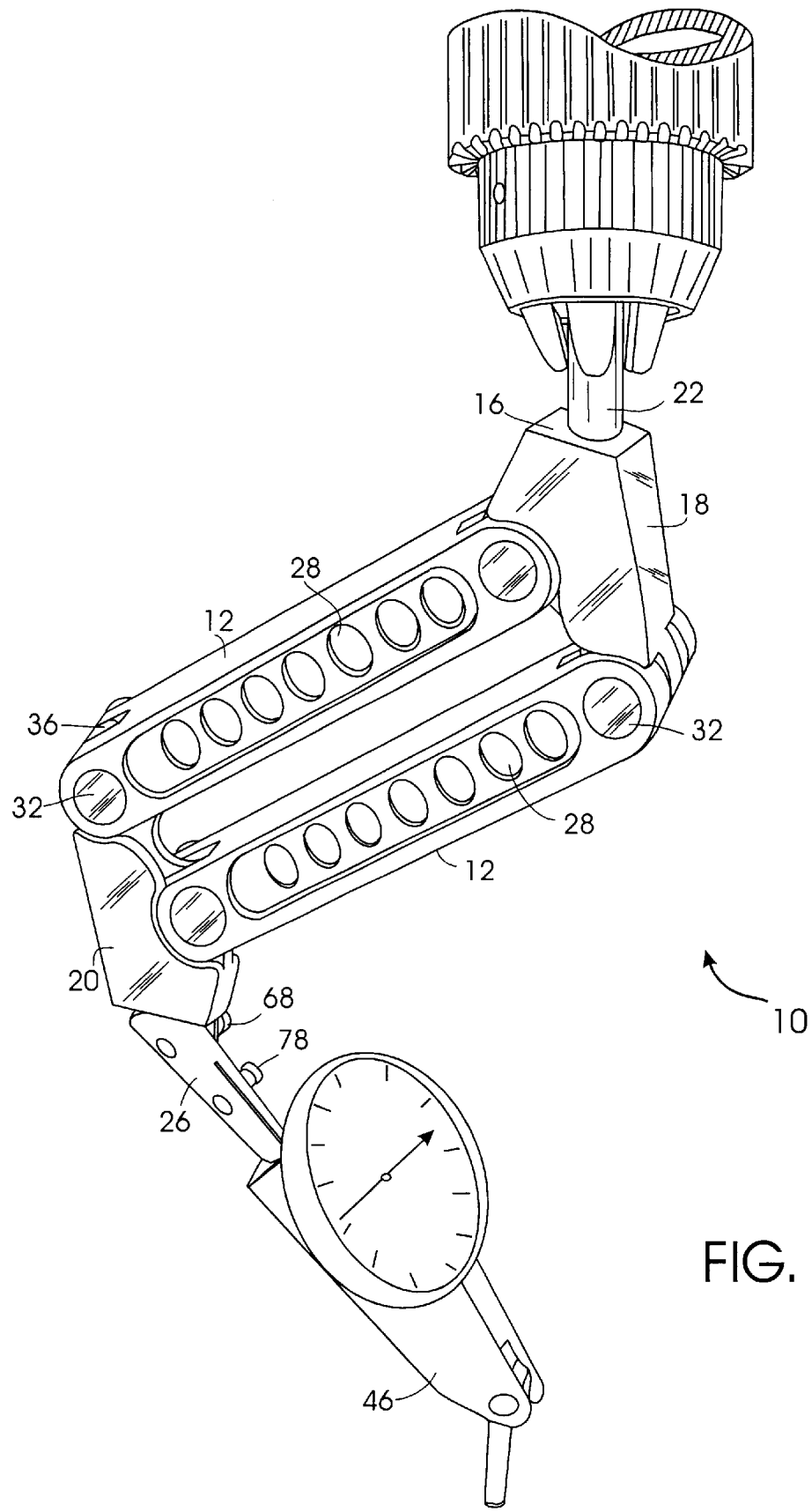
FIG. 1 is a perspective view of the preferred embodiment of the dial test indicator constructed in accordance with the principles of the present invention.

While this invention is susceptible of being embodied in many different forms, the preferred embodiment of the invention is shown in the drawings and described in detail hereinafter with the understanding that the present disclosure is to be considered to exemplify the principles of the present invention and is not intended to limit the invention to the embodiment illustrated.

With reference to the drawings, and in particular, to FIG. 1 thereof, the preferred embodiment of the new and improved dial test support embodying the principles and concepts of the present invention and generally designated by the reference number 10 will be described hereinafter.

In its broadest context, the present invention consists of at least a pair of pivoting arms 12, each having a distal end 14 and a proximal end 16, first 18 and second 20 pivoting ends, a mounting shank 22, and a pivoting stem 24 for attachment of a dovetail 26. Such components are individually configured with respect to each other so as to achieve the desired objectives.

In the preferred embodiment, each pivoting arm 12 is formed into an elongated configuration and generally includes a plurality of aperatures 28 extending therethrough, perpendicular to the pivoting arm's longitudinal axis. The presence of apertures along the length of the pivoting arms permits effective reduction in weight. This in turn, mitigates the potential for instrument sag or indicator drop, resulting in an instrument that is more conducive to accurate, precise measurement of the workpiece. Because of the structural weakening that may occur as a result of removing material from the pivoting arms for creation of the apertures, it is desirable to form the pivoting arms into an I-beam configuration, particularly between the distal and proximal ends, as means to maintain structural integrity throughout the pivoting arm, as seen in FIG. 2B. Each pivoting arm used in constructing the present invention are of the same size and configuration, are positioned parallel to one another and operate in unison. This configuration allows the indicator support to move along an axis parallel to the longitudinal axis of the tooling machine while maintaining constant latitude of the dial test indicator during adjustment thereof. As an added measure in making the indicator support as light as possible while maintaining structural integrity, the pivoting arms as well as the pivoting ends are preferably constructed of aircraft aluminum. Other materials known in the art can be used, providing such materials have physical properties similar to that of the preferred material.

Although the preferred embodiment of the present invention is described to have a pair of pivoting arms acting in unison, additional pivoting arms may be necessary in operation and would depend on the extent of having to reach the workpiece for accurate measurement while maintaining adequate rigidity of the indicator support. For most applications, a pair of pivoting arms 12 provides ample rigidity to acquire accurate measurement of the workpiece; however, more than two pivoting arms may be necessary when the instrument reach exceeds approximately ten inches.

Figure 9:
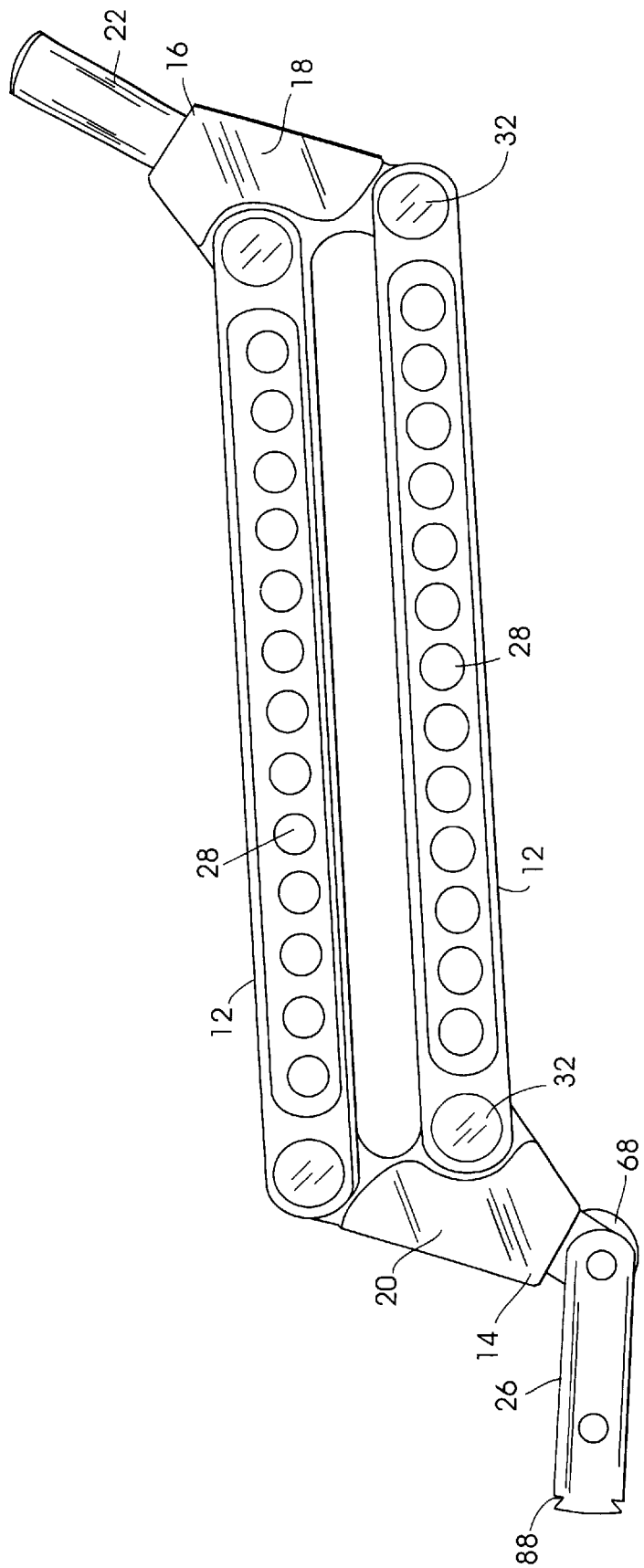
FIG. 9 is a side elevational view of the preferred embodiment of the dial test indicator support.
Figure 14:
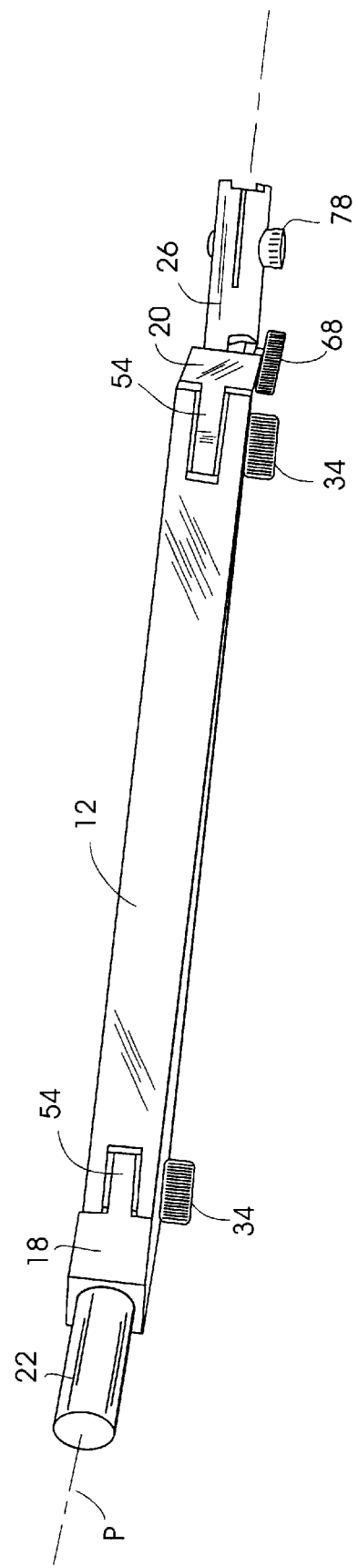
FIG. 14 is a top perspective view of the preferred embodiment of the dial test indicator support.

In further detail, as illustrated in FIGS. 3 and 4, each pivoting arm includes a non-threaded aperture 30 for passage of a pivoting screw 32 and acceptance of a knurled pivoting nut 34 and a pivoting slot 36 located at the distal and proximal ends 14, 16. Each non-threaded aperture includes a portion 38 thereof that is depressed to the extent of the depth and diameter of the head of the pivoting screw and geometric configuration of the pivoting nut. In order to maintain long-term reliability of the pivoting arm to pivot about the pivoting screw and to prevent inadvertent removal thereof, each pivoting screw is preferably press-fitted to the pivoting arm 12. Each pivoting nut 34 includes a threaded aperture 40 extending therethrough, a knurled head 42 and a lower wall 44 that is smaller in diameter than the head's diameter, as seen in FIGS. 5, 5A and 6. The thickness of the lower wall is sized and configured to fit tightly within the space resulting between the threaded portion of the pivoting screw 32 and depressed portion 38 of the pivoting arm, while the length of the lower wall is sized and configured to allow adequate space between the bottom portion of the head of the pivoting nut and the surface of the pivoting arm, as shown in FIG. 2A. This configuration prevents binding of the pivoting nut with the surface of the pivoting arm, while at the same time promotes added stability and rigidity to the pivoting arms during motion thereof about the pivoting screw. It is desirable in design to have the head of the pivoting screw flush with the surface of the pivoting arm, as shown in FIG. 9, with the knurled head 42 of the pivoting nut extending above the surface of the pivoting arm to allow for finger rotation thereof, as depicted in FIG. 14. Although the pivoting screw is permanently fastened to the pivoting arm, adjustment of the pivoting arms can be accomplished by simply loosening and tightening the pivoting nut 34. However, in most cases, it is unnecessary in operation to adjust the positioning of the pivoting arms 12 through adjustment of the pivoting nuts. Simple hand positioning of the pivoting arms near the workpiece is all that is often needed for accurate placement of a conventional dial test indicator 46.

As an added means of preventing inadvertent removal or loosening of the pivoting nut, each pivoting arm, in particular, at the location of the non-threaded aperture, includes a wave washer 48, as depicted in FIGS. 2A and 3. As shown in FIGS. 7 and 8, each wave washer, preferably constructed from spring steel, is formed into a circular configuration and includes an aperture 50 extending therethrough for passage of the pivoting screw 32. When viewed from the side, each wave washer has a wave-like appearance 52, as illustrated in FIG. 8. The wave washer is geometrically configured to fit between the pivoting nut and the pivoting arm, within the depressed portion provided for the lower wall 44 of the pivoting nut, as shown in FIG. 2A. As the pivoting nut is tightened against the pivoting arm, the wave washer is allowed to collapse to a certain degree, of which action provides adequate pressure to keep the pivoting nut in a stationary position during normal operation of the indicator support.

Referring now to FIGS. 2 and 3, the pivoting slot 36, located at the distal and proximal ends 14, 16, is geometrically configured to accept a portion of the pivoting end referred to as a pivoting flange 54. Each pivoting end 18, 20 comprises at least two pivoting flanges protruding therefrom, each having an aperture 55 extending therethrough for passage of the pivoting screw, and a longitudinal bore 56 to accept either the mounting shank 22 or the pivoting stem 24, as shown in FIGS. 2 and 11 through 13. The number of pivoting flanges required in design is dependant on the number of pivoting arms used, which in turn, is dependant on the extent of instrument reach, as described hereinbefore. The pivoting flange is design to be interposed within the pivoting slot 36 and is sized and configured to fit within close tolerances of the pivoting slot in order to provide a level of effective frictional forces therebetween. These fictional forces are a critical component as to how reliable and accurate the instrument performs in daily operations. Because of the increased friction that results through the physical contact of metallic-constructed pivoting arms 12 and pivoting ends 18, 20, the surface of each pivoting flange 54 is preferably fitted with a washer 58 made from Nylatron®, as illustrated in FIG. 2A. Although many types of washers and the alike were sought in the evaluation for long-term wear and lubricity characteristics, none match the cold flow and wear properties of Nylatron®.

As seen in FIG. 2, the mounting shank 22 is preferably formed into a cylindrical configuration and is sized at one end to fit within the longitudinal bore 56 of the first pivoting end 18, with the other end being sized and configured to fit within the space defined by the spindle or chuck of the tooling machine, as depicted in FIG. 1. It is preferred that the mounting shank, as well as the pivoting screw and nut, be constructed from stainless steel or a equivalent material presently known in the art. In order to maintain structural integrity of the indicator support, the mounting shank is press-fitted within the longitudinal bore of the first pivoting end 18.

As illustrated in FIGS. 15 and 16, the pivoting stem 24 consists of a cylindrical portion 60 at one end, which is adaptable to fit within the longitudinal bore 56 of the second pivoting end 20, and a second end 62, which is adaptable to accommodate the dovetail. Similar to what was described for the mounting shank, the cylindrical portion of the pivoting stem is preferably press-fitted into the second pivoting end to provide greater strength and rigidity to the indicator support during normal use. The other end of the pivoting stem comprises a mounting flange 64, which includes a non-threaded aperture 66 extending therethrough to permit passage of a thumb screw 68, as shown in FIG. 2. The mounting flange is geometrically flat on one side so as to accommodate the geometric configuration of the dovetail 26, with the opposite side being formed to correspond to a portion 70 of the dovetail that is cylindrical and curvature in shape, as depicted in FIG. 16. This geometric configuration permits pivotal movement of the dovetail about the thumb screw, but restricts lateral motion along an axis parallel to the longitudinal axis of the thumb screw. The resulting rigidity mitigates the potential of acquiring inaccurate measurement of the workpiece.

Figure 10:
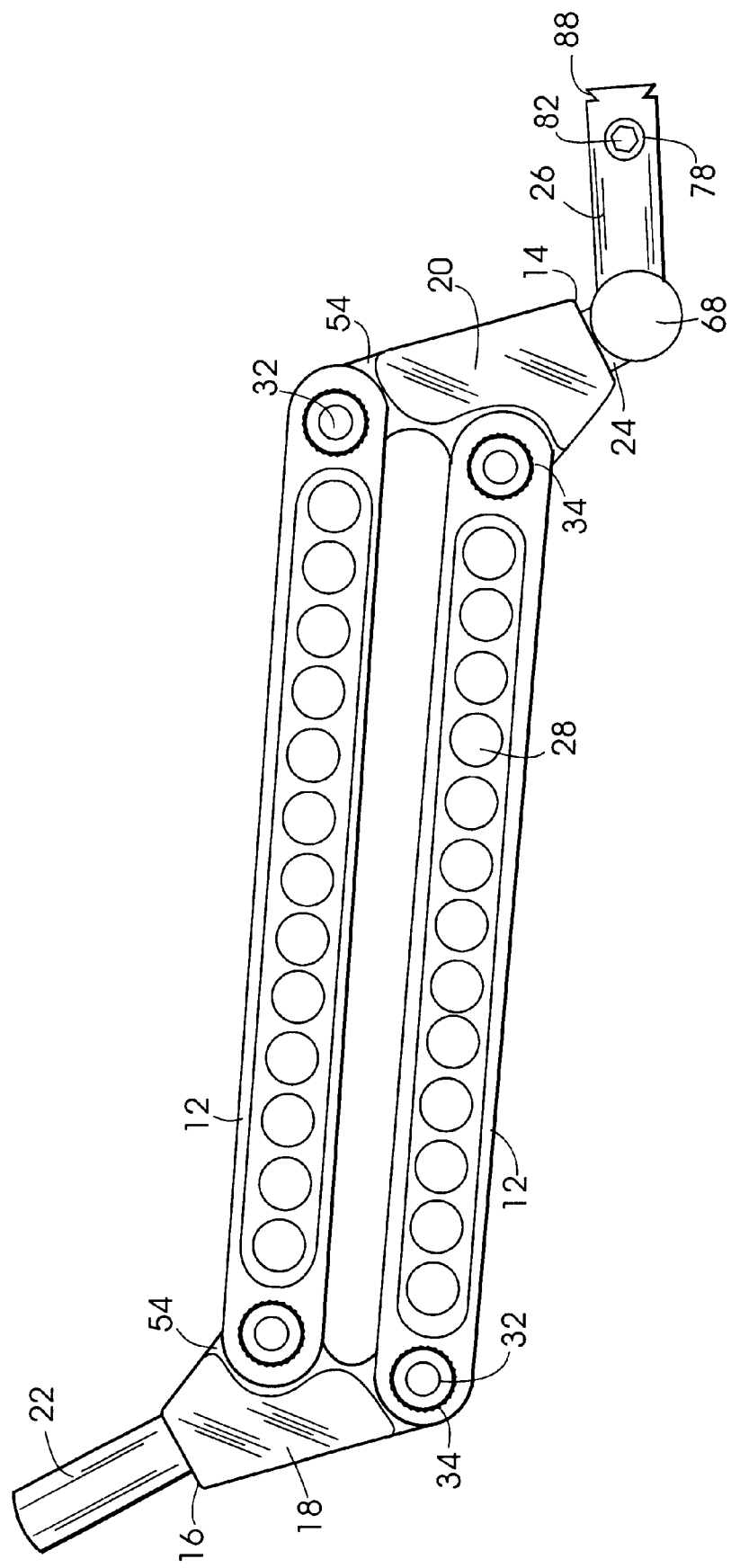
FIG. 10 is a side elevational view of the preferred embodiment of the dial test indicator support.
Figure 13:
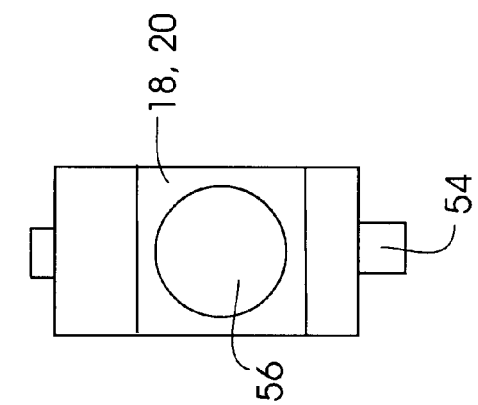
FIG. 13 is a top plan view of the pivoting end of FIGS. 11 and 12.
Figure 12:
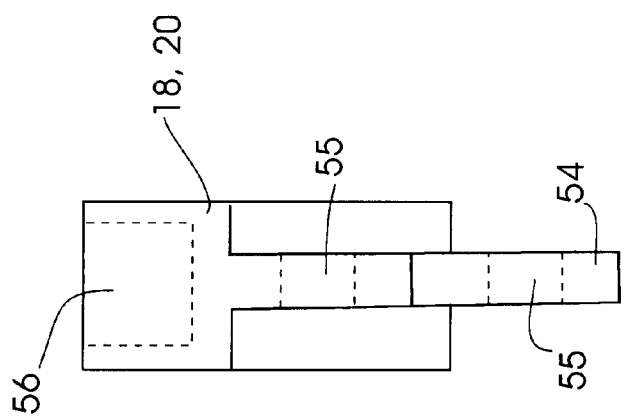
FIG. 12 is a side elevational view of the pivoting end of FIG. 11.
Figure 11:
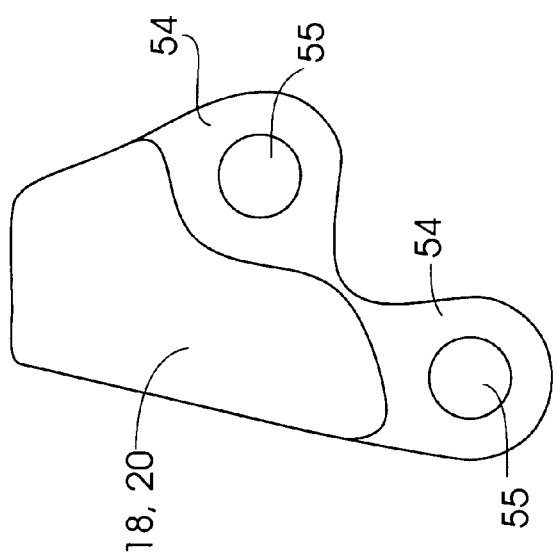
FIG. 11 is a side elevational view of the pivoting end in isolation.

As shown in FIGS. 17 and 18, the dovetail 26 is formed into a cylindrical configuration and consists of a pair of threaded apertures 72, 74 of which extend perpendicular to the longitudinal axis of the dovetail and are parallel to one another. The first aperture 72 is located at one end of the dovetail, where the dovetail is pivotally connected to the mounting flange by the thumb screw 68, and the second aperture 74 is located approximately two-thirds the distance from the end of the dovetail that pivotally mates with the mounting flange. The second aperture includes a portion 76 thereof that is depressed to geometrically accept a threaded dovetail setscrew 78, of which includes a knurled head 80 for finger rotation thereof and a hexagonal-shaped depression 82 to accept a common allen wrench or other devices of similar configuration, as illustrated in FIGS. 2, 10 and 18. The dovetail also comprises a longitudinal bore 84 generally defined by the diameter and length of a dial test indicator mounting shank and a slot 86 transversing the dovetail and extending the length the longitudinal bore. It is preferred that the width of the slot be of such size to allow for minute collapse or expansion of the end of the dovetail in order to accommodate a variety of dial test indicator shank diameters, as seen in FIG. 17.

Now referring to FIG. 19, to accommodate for dial test indicators equipped with a dovetail-tongued mount, as opposed to those with a mounting shank, the bottom of the dovetail comprises an inverted v-shaped groove 88 that extends perpendicular to the longitudinal axis of the dovetail and transverses the longitudinal bore of the dovetail. In operation, the dovetail-tongued mount is slideably fitted within the area defined by the inverted v-shaped groove and the dovetail setscrew 78 is rotated clockwise until the end of the dovetail 26 collapses tightly and securely around the dovetail-tongued mount. This positioning prevents lateral movement of the dial test indicator during normal use and adjustment thereof.

In order to mitigate the potential of having the dovetail 26 become loose during movement thereof, the pivoting stem 24 is fitted with a belleville spring 90, which is disposed between the head of the thumb screw and the cylindrical portion 60 of the pivoting stem, as seen in FIG. 2. The belleville spring, which has an arcuate-shaped profile, provides adequate pressure against the thumb screw head to restrict inadvertent movement thereof while allowing secure pivotal movement of the dovetail about the thumb screw 68.

All components of the present invention are arranged along a common center line and in a single plane, as indicated at P in FIG. 14. This arrangement eliminates torsional moment, while at the same time mitigates the potential of having the indicator support possess undue springiness that may result from the presence of gravitational forces acting thereon. Thus, the indicator support is capable of acquiring precise, accurate measurement of the workpiece, notwithstanding the length and reach of the indicator support.

Further, the dial test indicator support 10 is capable of accommodating dial test indicators having attachment means comprising a mounting shank or a dovetail-tongue mount. Thus, the support can be used with virtually all commercially available dial test indicators. Additionally, the present invention is adaptable for use with milling machines, lathes, drill presses and other tooling machines capable of supporting either a ten millimeter or ⅜-inch mounting shank. The interchangeability of parts also permits the indicator support to be utilized with conventional height gauges.

As an added advantage, the present invention incorporates the use of lightweight materials and includes pivotal connection points that are rigid, but allow for precise travel of the pivoting arm upon readjustment thereof. Dial test indicator holders and supports that afford greater reach through the addition of links or arms have a tendency to acquire inaccurate measurement of the workpiece due to excessive weight and influence of gravitational forces acting thereon. Potential for indicator sag or drop is even more pronounced when excessive reach is along the horizontal axis, such as when using the indicator support with a horizontal boring machine. The present invention is designed to counter the effects of indicator drop, and thus acquire accurate, precise measurement of the workpiece, by incorporating lightweight materials, possessing rigid pivoting connections and eliminating torsion about the center line of the dial test indicator support.

Figure 20:
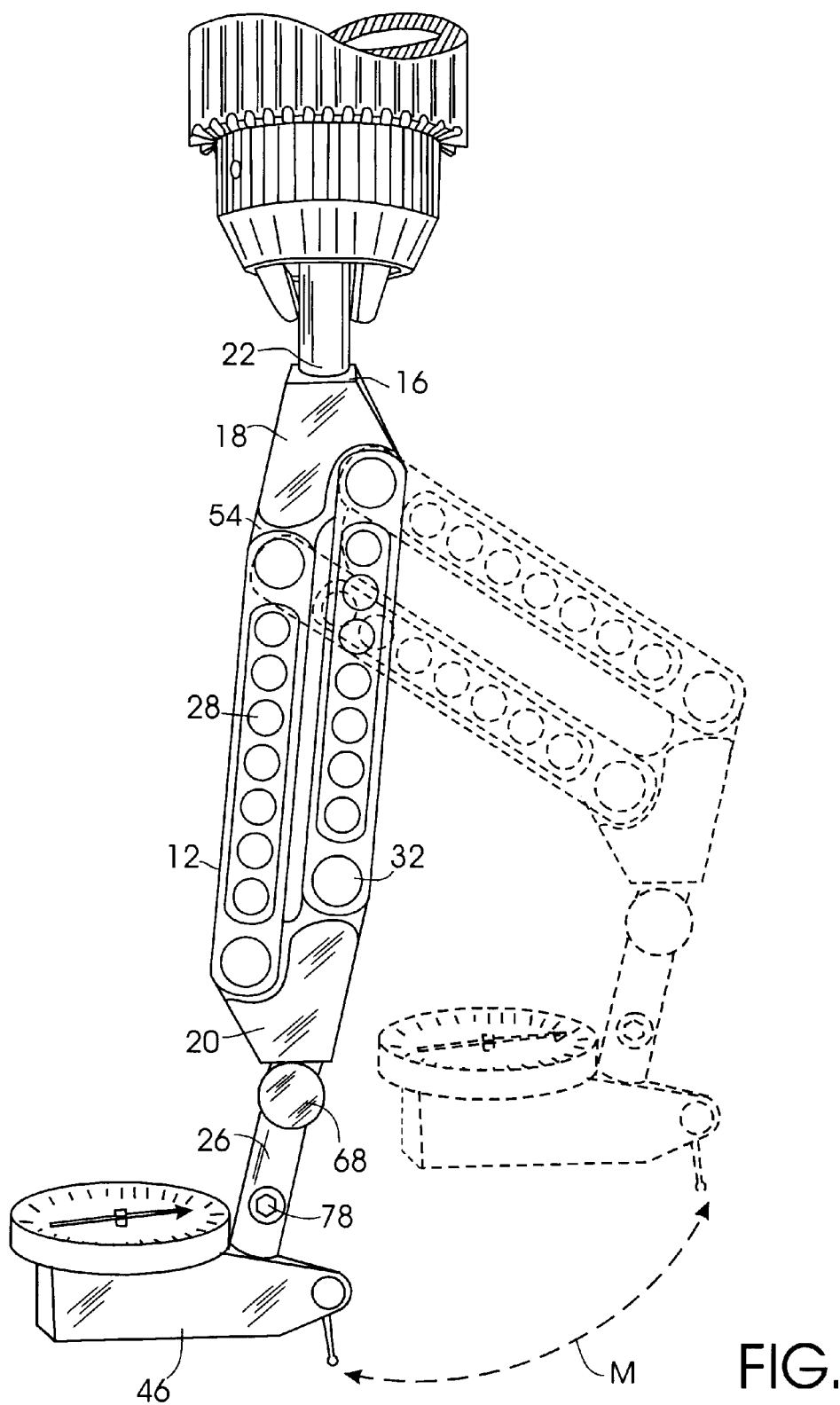
FIG. 20 is a perspective view of the preferred embodiment of the dial test indicator showing constant latitude of the dial test indicator during movement thereof along line M.

However, the most important feature of the present invention is its ability to maintain constant latitude during the full range of motion. In operation of conventional type indicator holders and supports, the user is required to readjust fastening screws and the alike and relocate the arms or links in order to take a series of measurements of the workpiece. In contrast, the present invention allows the user to acquire progressive measurement of the workpiece by simply handling and relocating the arms of the indicator support to the desired position. With the present invention, as opposed to indicator holders and supports revealed in the prior art, there is no need to readjust the angle at which dial test indicator is initially set. As depicted along line M in FIG. 20, the angle at which the dial test indicator is set remains constant throughout the full range of motion, thereby eliminating the need to readjust the dovetail and dial test indicator for subsequent measurement of the workpiece. Undoubtedly, the present invention has versatile applicability in many machining environments having a high demand for precise, accurate measurement of the workpiece.

As to the manner of usage and operation of the present invention, the same should be apparent from the description as described above. Accordingly, no further discussion relating to the manner and method of usage and operation will be included herein.

With respect to the above description then, it is to be realized that the optimum dimensional relationships for the parts of the present invention, to include variation in size, shape, materials, form, function, and the manner and method of operation, assembly and use, are deemed readily apparent and obvious to one skilled in the art, and all the equivalent relationships to those illustrated in the drawings and described in the specification are intended to be encompassed by the present invention.

While there has been shown and described a particular embodiment of the invention, it will be obvious to those skilled in the art that various changes and alterations can be made therein without departing from the invention and, therefore, it is aimed in the appended claims to cover all such changes and alterations that fall within the true spirit and scope of the invention.

What is claimed is:

1. An apparatus for supporting a dial test indicator in a tooling machine, said apparatus comprising:

at least a pair of pivoting arms being positioned parallel to one another for unison operation; each of said pivoting arms including a distal end and a proximal end, with each of said ends including an aperture extending therethrough;

first and second pivoting ends, each having at least a pair of pivoting flanges projecting therefrom, each of said pivoting flanges having an aperture extending therethrough alignable with said apertures of said proximal and distal ends, respectively and;

means for pivotally attaching said pivoting flanges of said first and second pivoting ends with that of said distal and proximal ends of said pivoting arms;

means for attaching said first pivoting end to a tooling machine; and a dovetail having means for pivotal attachment to said second pivoting end, said dovetail attachment means comprising a pivoting stem formed in a cylindrical configuration at one end being fixedly attached to said second pivoting end and a second end having a geometric configuration corresponding to the geometric configuration of said dovetail and a threaded aperture extending therethrough for passage of a thumb screw.

2. An apparatus for supporting a dial test indicator as set forth in claim 1, wherein each of said pivoting arms are formed in an elongated configuration and further comprise a pivoting slot located at said distal and proximal ends, said pivoting slot being geometrically configured to slideably accept said pivoting flange therein between.

3. An apparatus for supporting a dial test indicator as set forth in claim 1, wherein said attachment means comprises a mounting shank having a cylindrical configuration to adaptably fit within the space defined by a spindle of the tooling machine.

4. An apparatus for supporting a dial test indicator as set forth in claim 1, wherein said first and second pivoting ends each include a cylindrical space bored to a predetermined depth.

5. An apparatus for supporting a dial test indicator as set forth in claim 1, wherein each of said pivoting arms further comprise a plurality of apertures extending therethrough for reduction of weight thereof.

6. An apparatus for supporting a dial test indicator as set forth in claim 1, wherein said dovetail is formed in a cylindrical configuration and further comprises a longitudinal bore having a space defined by the length and diameter of the mounting shank of the dial test indicator, a slot transversing said dovetail and extending the length of said longitudinal bore, a first threaded aperture extending through said dovetail, perpendicular to said longitudinal bore, for passage of a dovetail setscrew to tightenly secure the mounting shank of the dial test indicator to said dovetail, and a second threaded aperture extending through said dovetail, perpendicular to said longitudinal bore and parallel to said first threaded aperture, for passage of a thumb screw for pivotal attachment of said dovetail.

7. An apparatus for supporting a dial test indicator as set forth in claim 1, wherein said pivoting end attachment means comprises a pivoting screw extending through said alignable apertures of said distal and proximal ends and said first and second pivoting ends, respectively, a pair of washers slideably fitted on said pivoting screw, between said pivoting end and said distal and proximal ends to promote slideable pivotal movement of said pivoting arms about said pivoting screw, and a pivoting nut threadably engaged to the end of said pivoting screw to tighteningly secure said pivoting arms to said pivoting ends.

8. A method of supporting a dial test indicator in a tooling machine for operation on a workpiece, said method comprising the steps of:

providing a dial indicator support having at least a pair of pivoting arms each having a distal end and a proximal end, with each end having an aperture extending therethrough and a pivoting slot, said pivoting arms being positioned parallel to one another for operation in unison, first and second pivoting ends each having at least a pair of pivoting flanges, each of said flanges including an aperture extending therethrough alignable with said apertures of said distal and proximal ends and having a geometric configuration to slideably fit within said pivoting slot, said pivoting flanges further comprising a cylindrical space extending therein to a predetermined depth, means for pivotally attaching said flanges of said first and second pivoting ends with that of said distal and proximal ends of said pivoting arms; a mounting shank-having cylindrical configuration and being adaptably fitted within said cylindrical space of said first pivoting end; and a pivoting stem having a first end and a second end, said first end including an aperture extending therethrough for passage of a thumb screw to tighteningly secure a dovetail thereto, said second end having a cylindrical configuration and being adaptably fitted within cylindrical space of said second pivoting end;

inserting said mounting shank within a spindle of the tooling machine;

attaching a dial test indicator to said dovetail;

selectively positioning said pivoting arms and said dovetail near the workpiece; and manually tightening said thumb screw to secure said dovetail in a stationary position.

9. A method of supporting a dial test indicator in a tooling machine for operation on a workpiece as set forth in claim 8, wherein said dovetail further comprises a longitudinal bore having a space defined by the diameter and length of a dial test indicator mounting shank, a slot transversing said dovetail and extending the length of said longitudinal bore, and a threaded aperture extending therethrough, perpendicular to the longitudinal axis of said dovetail, for passage of a dovetail setscrew to tighteningly secure the dial test indicator to said dovetail.

10. A method of supporting a dial test indicator in a tooling machine for operation on a workpiece as set forth in claim 8, wherein said dovetail further includes an end having an inverted v-shaped groove of which is capable of accepting a dial test indicator equipped with a dovetail-tongued mount.

11. An apparatus for supporting a dial test indicator in a tooling machine, said apparatus comprising:

at least a pair of pivoting arms each having a distal end and a proximal end and comprising a pivoting slot located at said distal and proximal ends, said ends including a an aperture extending therethrough to permit passage of a pivoting screw;

first and second pivoting ends, each having a cylindrical space bored to a predetermined depth and at least a pair of pivoting flanges each having an aperture extending therethrough alignable with said apertures of said distal and proximal ends, said pivoting ends being geometrically configured to slideably fit within said pivoting slot;

a mounting shank having two ends, one such end having a cylindrical configuration which is adaptably fitted within the space defined by a spindle of a tooling machine and a second end which is adaptably fitted within said cylindrical space of said first pivoting end;

a pivoting stem having a threaded aperture at one end and a second end which is adaptably fitted within said cylindrical space of said second pivoting end;

a plurality of pivoting nuts threadably engaged to each of said pivoting screws to tighteningly secure said pivoting arms to said pivoting ends; and a dovetail having a cylindrical configuration with one end having a first threaded aperture extending therethrough alignable with said aperture of said pivoting stem for passage of a thumb screw to permit pivotal movement of said dovetail thereabout and a second end having an inverted v-shaped groove therein capable of accepting a dovetail-tongued mount.

12. An apparatus for supporting a dial test indicator as set forth in claim 11, wherein said pivoting screw is fitted with a pair of washers of which are located on each side of said pivoting flange to promote slideable movement of pivoting arms and pivoting flanges about said pivoting screw.

13. An apparatus for supporting a dial test indicator as set forth in claim 11, wherein said dovetail further comprises a longitudinal bore having a space defined by the diameter and length of the mounting shank of the dial test indicator and a slot transversing said dovetail and extending the length of said longitudinal bore.

14. An apparatus for supporting a dial test indicator as set forth in claim 11, wherein said dovetail further comprises a second threaded aperture parallel to said first threaded aperture of said dovetail and located approximately two-thirds the distance from the end of said dovetail comprising said thumb screw.

15. An apparatus for supporting a dial test indicator as set forth in claim 14, wherein said second threaded aperture is geometrically configured to accept a dovetail setscrew having a head that is knurled to permit finger rotation thereof and a depression that is hexagonal in shape to accept a wrench of similar configuration.

16. An apparatus for supporting a dial test indicator as set forth in claim 11, wherein said pivoting stem is adaptably fitted with a belleville spring having an arcuate-shaped profile, said spring being situated between the head of said thumb screw and the end of said pivoting stem having said aperture extending therethrough, whereby said spring provides adequate pressure against said thumb screw to restrict inadvertent movement thereof while allowing secure, pivotal movement of said dovetail about said thumb screw.

17. An apparatus for supporting a dial test indicator as set forth in claim 11, wherein said pivoting stem end comprising said aperture is geometrically flat on one side and curved on the opposite side of which configuration adaptably corresponds to the geometric configuration of said dovetail end comprising said first threaded aperture.

18. An apparatus for supporting a dial test indicator as set forth in claim 11, wherein each pivoting screw is adaptably fitted with a wave washer having a wave-like profile, said wave washer being geometrically configured to fit between said pivoting nut and said pivoting arm to prevent inadvertent rotation of said pivoting nut.

19. An apparatus for supporting a dial test indicator as set forth in claim 11, wherein said aperture of said distal and proximal ends includes a portion thereof that is depressed to the extent of accommodating the geometric configuration of said pivoting screw head.

* * * * *